(12) United States Patent
Hagen et al.

(10) Patent No.: US 7,352,691 B2
(45) Date of Patent: Apr. 1, 2008

(54) DOUBLE DIFFERENCE PHASE DETECTION

(75) Inventors: Mark D. Hagen, Rochester, MN (US);
Mark D. Heminger, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 576 days.

(21) Appl. No.: 11/010,087

(22) Filed: Dec. 10, 2004

(65) Prior Publication Data

US 2006/0126490 A1 Jun. 15, 2006

(51) Int. Cl.
*H04J 11/00* (2006.01)
*H04J 3/24* (2006.01)
*H04L 27/28* (2006.01)
*H04B 1/04* (2006.01)

(52) U.S. Cl. ............... 370/210; 370/208; 370/480; 375/260; 375/362; 455/78; 714/793

(58) Field of Classification Search ........ 370/203–210, 370/480, 509; 375/141–147, 232, 260, 356, 375/362; 455/78, 562.1, 450, 452.1, 561; 714/793
See application file for complete search history.

(56) References Cited

U.S. PATENT DOCUMENTS

2003/0193970 A1* 10/2003 Kim et al. ................ 370/509
2005/0041622 A1* 2/2005 Dubuc et al. ............. 370/332
2006/0114981 A1* 6/2006 Ghosh et al. ............. 375/232

\* cited by examiner

*Primary Examiner*—Afsar Qureshi
(74) *Attorney, Agent, or Firm*—Wade J. Brady, III; Frederick J. Telecky, Jr.

(57) ABSTRACT

A method that allows a digital communications system to detect the presence of transmitted messages in noisy environments. The system includes an OFDM transmitter and an OFDM receiver. The OFDM transmitter converts a digital signal to be transmitted to a plurality of sub-signals, each corresponding to a respective sub-carrier frequency. The signal is a packet including a preamble field having a known data pattern. The transmitter pre-codes the preamble data pattern, maps the data to corresponding phase information, converts the sub-signals to the time domain, and converts the sub-signals to analog form for subsequent transmission. The OFDM receiver receives the transmitted sub-signals, converts the sub-signals to digital form, converts the sub-signals to the frequency domain, and subjects the sub-signals to preamble detection processing to detect the signals' presence. By pre-coding the preamble data pattern and defining the received sub-signals in terms of the phase difference between adjacent sub-carriers, the detection of the transmitted messages can be performed in a manner that is insensitive to phase offset.

29 Claims, 8 Drawing Sheets

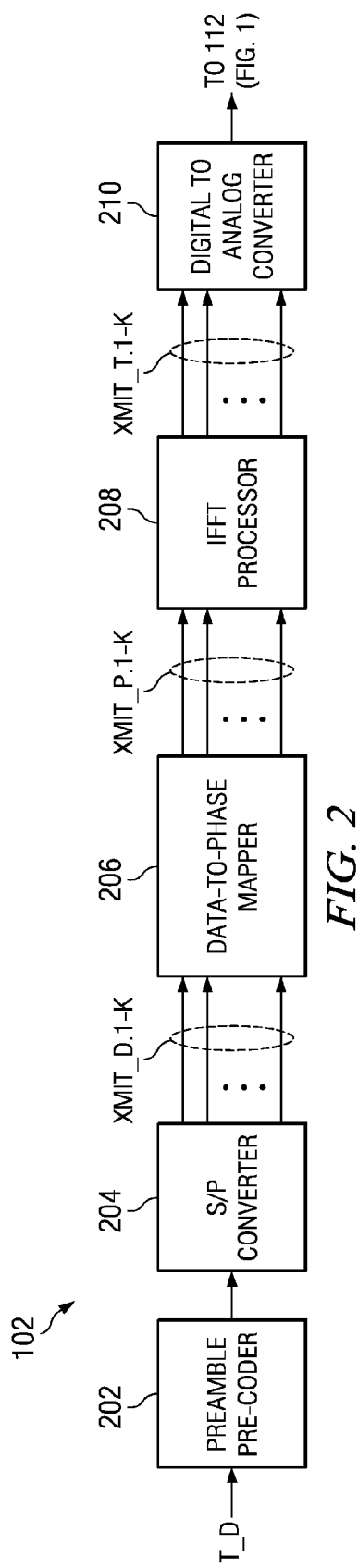
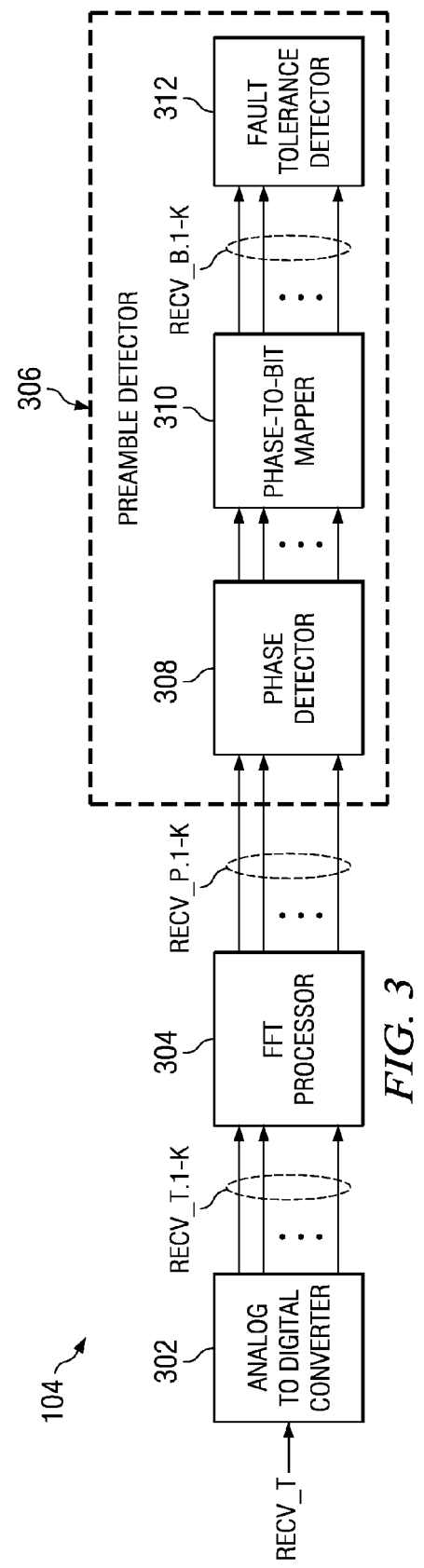
FIG. 2
FIG. 3

DOUBLE DIFFERENCE PHASE DETECTION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present application relates generally to digital communications systems, and more specifically to improved systems and methods of detecting the presence of a transmitted message at a receiver in a noisy environment.

In recent years, the orthogonal frequency division multiplexing (OFDM) technique has been increasingly employed in digital communications systems due to its resilience to noise and multi-path interference. A conventional OFDM communications system includes an OFDM transmitter and an OFDM receiver. The OFDM transmitter is operative to convert a digital signal to be transmitted to a plurality of sub-signals, each of which corresponds to a different sub-carrier frequency. The OFDM transmitter is further operative to map the data contained in each sub-signal to corresponding amplitude and phase information, to convert the mapped sub-signals from the frequency domain to the time domain using the inverse fast Fourier transform (IFFT) algorithm, and to convert the digital sub-signals to analog form for subsequent transmission at the various sub-carrier frequencies. The OFDM receiver is operative to receive transmitted sub-signals, to convert the analog sub-signals to digital form, to convert the received sub-signals from the time domain to the frequency domain using the fast Fourier transform (FFT) algorithm, and to subject the received sub-signals to phase detection processing to detect the signals' presence and to extract the data contained therein.

Although the conventional OFDM communications system transmitting signals at multiple sub-carrier frequencies generally has increased resiliency to noise and multi-path interference, the system has drawbacks in that the detection of the transmitted signals at the OFDM receiver can be problematic. For example, each signal to be transmitted typically comprises at least one packet including multiple frames, each of which contains multiple waveform samples. To detect a transmitted signal, the OFDM receiver generally samples each transmitted signal at a given sampling frequency. Accordingly, if the sampling of the transmitted signals at the OFDM receiver is synchronized with the timing of the OFDM transmitter and the samples corresponding to the start of the respective frames are known, then the data contained in the signals can be detected by simply reversing the mapping of the signal phases to their corresponding data values.

In conventional OFDM communications systems, however, the OFDM receiver is typically remote from the OFDM transmitter, and the transmitted signals generally arrive at the remote receiver asynchronously. As a result, not only may the OFDM receiver have difficulty determining which ones of the received samples correspond to the start of each transmitted frame, but it also may have difficulty detecting the mere presence of transmitted signals, especially in noisy environments.

One way of detecting the presence of transmitted signals at a remote OFDM receiver is to determine the presence (or absence) of one or more of the sub-carrier signals. However, this approach has drawbacks because to determine whether or not a sub-carrier is present, it is usually necessary to compare the signal power at frequencies different from the transmitted sub-carrier frequencies. As a result, additional bandwidth must typically be allocated at the receiver to accommodate these added frequencies. Moreover, in very noisy environments, it is often difficult to discriminate between transmitted signals and noise based solely upon a consideration of the received signal power.

It would therefore be desirable to have an improved method of detecting transmitted signals in digital communications systems that avoids the drawbacks of the above-described conventional communications systems.

BRIEF SUMMARY OF THE INVENTION

In accordance with the present invention, a method is provided that allows a digital communications system to detect the presence of transmitted messages in noisy environments. In one embodiment, the digital communications system employs the orthogonal frequency division multiplexing (OFDM) technique. The presently disclosed OFDM communications system includes an OFDM transmitter and an OFDM receiver. The OFDM transmitter is operative to convert at least one digital signal to be transmitted to a plurality of sub-signals, each of which corresponds to a respective sub-carrier frequency. The digital signal to be transmitted comprises at least one packet that includes a preamble field having a known data pattern and a data field. The OFDM transmitter is further operative to pre-code the data pattern in the preamble field, to map the data contained in each sub-signal to corresponding amplitude and phase information, to convert the mapped sub-signals from the frequency domain to the time domain using the inverse fast Fourier transform (IFFT) algorithm, and to convert the digital sub-signals to analog form for subsequent transmission at the various sub-carrier frequencies. The OFDM receiver is operative to receive transmitted sub-signals, to convert the analog sub-signals to digital form, to convert the received sub-signals from the time domain to the frequency domain using the fast Fourier transform (FFT) algorithm, and to subject the received sub-signals to preamble detection processing to detect the signals' presence and to extract the data contained therein.

In the presently disclosed embodiment, the preamble field of each packet includes a plurality of frames, each of which includes $N=2^n$ waveform samples. Further, the OFDM transmitter is operative to map the data pattern contained within the preamble field to complex modulation values for each sub-carrier frequency. When transmitted sub-signals are received at the OFDM receiver, the FFT algorithm is employed to generate a set of complex phase values $\theta_k$ corresponding to each sub-carrier frequency. The complex phase value $\theta_k$ associated with each sub-carrier frequency has a phase $D_k$ and a phase offset $\alpha(n,k)$. The phase $D_k$ is a function of the original transmitted phase, which is determined based on the data pattern in the preamble field. The phase offset $\alpha(n,k)$ is caused by a misalignment between the transmitted and received frames of the preamble field. In one embodiment, the sub-carrier phase value $\theta_k$ is expressed as $$\theta_k = D_k + \alpha(n,k),$$

in which "$D_k$" is the phase defined by the preamble data pattern for the respective sub-carrier frequency, and "$\alpha(n,$ k)" is the phase offset relative to the start of the received frame. Specifically, "n" is the phase offset of the received frame from the transmitted frame, and "k" is a bin number corresponding to the sub-carrier frequency. Further, the phase offset α(n,k) is expressed as $$\alpha(n,k) = \frac{n \cdot k}{N \cdot F_s} 2\pi,$$

in which "N" is the length (i.e., the number of waveform samples) of the received frame, and "$F_s$" is the sampling frequency.

By defining the received sub-signals in terms of the phase difference between adjacent sub-carriers, and by pre-coding the data pattern in the preamble field at the OFDM transmitter such that $$D_k = \sum_{n=0}^{k}(k+1-n)m_n, \text{ and } \vec{m} = [m_0, m_1, \ldots, m_k, \ldots, m_{M-1}],$$

in which "$\vec{m}$" represents M 2-bit data symbols that make up the preamble data pattern for the respective sub-carrier frequency, the detection of the preamble at the OFDM receiver can be performed in a manner that is insensitive to phase, i.e., insensitive to the phase offset n. Further, because each value generated by the FFT algorithm is a Cartesian complex pair $x_k$, $y_k$, in which "$x_k$" is the real part and "$y_k$" is the imaginary part of the detected sub-carrier signal power, the preamble detection processing at the OFDM receiver is performed such that $$dd\theta_k = a\tan\left(\frac{q}{p}\right),$$

in which $$q = \frac{(x_{k-1}x_{k-2}+y_{k-1}y_{k-2})(y_k x_{k-1}-x_k y_{k-1})-(x_k x_{k-1}+y_k y_{k-1})}{(y_{k-1}x_{k-2}-x_{k-1}y_{k-2})}, \text{ and}$$

$$p = \frac{(x_k x_{k-1}+y_k y_{k-1})(x_{k-1}x_{k-2}+y_{k-1}y_{k-2})+(y_k x_{k-1}-x_j y_{k-1})}{(y_{k-1}x_{k-2}-x_{k-1}y_{k-2})}.$$

Accordingly, by comparing "q" to "p", the quadrant of the Cartesian plane in which the corresponding phase resides may be determined without having to perform the arctangent function atan(q/p). For example, for the following illustrative phase-to-bit mapping,

| phase | bit1 | bit0 | p  | q  | −q > p | \|q\| > \|p\| |
|-------|------|------|----|----|--------|---------------|
| 0°    | 0    | 0    | 1  | 0  | 0      | 0             |
| 90°   | 0    | 1    | 0  | 1  | 0      | 1             |
| 180°  | 1    | 0    | −1 | 0  | 1      | 0             |
| 270°  | 1    | 1    | 0  | −1 | 1      | 1             | the comparison of q and p is performed as follows, $\text{bit}_{1k} = -q_k > p_k,$ $\text{bit}_{0k} = |q_k| > |p_k|,$ and $dd\theta_k = 2\text{bit}_{1k} + \text{bit}_{0k}.$ After the phase of each sub-carrier in the received preamble frame has been detected, it is compared to the expected phase of the known preamble data pattern. In one embodiment, the distance of each sub-carrier phase from the expected phase is defined as $\text{distance}_k = |dd\theta_{k(detected)} - dd\theta_{k(expected)}|.$ Further, a metric for the phase error between the received signal and the transmitted signal is defined as $$ddPhaseError = \sum_{k=0}^{M} \text{distance}_k,$$

which is the sum of the distances for each sub-carrier phase. By comparing "ddPhaseError" to a predetermined threshold, it can be determined whether or not a frame received at the OFDM receiver indicates the presence of a transmitted message, even in noisy environments.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 2 is a block diagram of the OFDM transmitter of FIG. 1;

FIG. 3 is a block diagram of the OFDM receiver of FIG. 1;

DETAILED DESCRIPTION OF THE INVENTION

Figure 1:
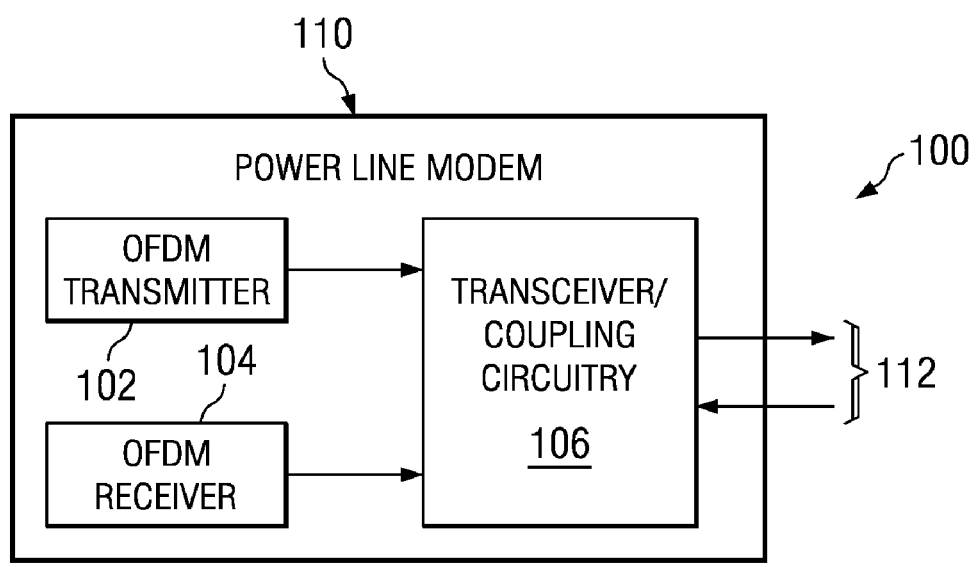
FIG. 1 is a block diagram of an OFDM communications system including an OFDM transmitter and an OFDM receiver according to the present invention, in which the OFDM communications system is employed in a power line modem.

An orthogonal frequency division multiplexing (OFDM) communications system is disclosed that is capable of detecting the presence of a transmitted message at a receiver in an environment having a substantial level of noise. FIG. 1 depicts an illustrative embodiment of an OFDM communications system 100, in accordance with the present invention. In the illustrated embodiment, the OFDM communications system 100 is employed in a power line modem 110 coupleable to a power line 112. Those of ordinary skill in this art will appreciate that in power line communications systems, transmitted signals are piggybacked onto existing power lines along with the AC line current already present on the lines for delivering electrical power. Communications channels implemented by power lines typically provide a very hostile environment for data communications due to, for example, power surges and noise spikes on the lines and variations in the impedance of the lines as devices are alternately plugged into and unplugged from the lines. The OFDM communications system 100 is capable of detecting the presence of a transmitted signal at the OFDM receiver, even in a noisy environment such as that provided by power lines. It is understood, however, that the implementation of the OFDM communications system 100 within the power line modem 110 is described herein for purposes of illustration, and that the OFDM communications system 100 may alternatively be employed in any suitable communications environment.

As shown in FIG. 1, the OFDM communications system 100 includes an OFDM transmitter 102 and an OFDM receiver 104. The power line modem 110 further includes power line transceiver and coupling circuitry 106 for communicably coupling the OFDM transmitter 102 and the OFDM receiver 104 to the power line 112. It is noted that the structure and operation of the power line transceiver and coupling circuitry 106 for transmitting and receiving messages over the power line 112 are known to those skilled in this art and therefore need not be described in detail herein.

Figure 4:
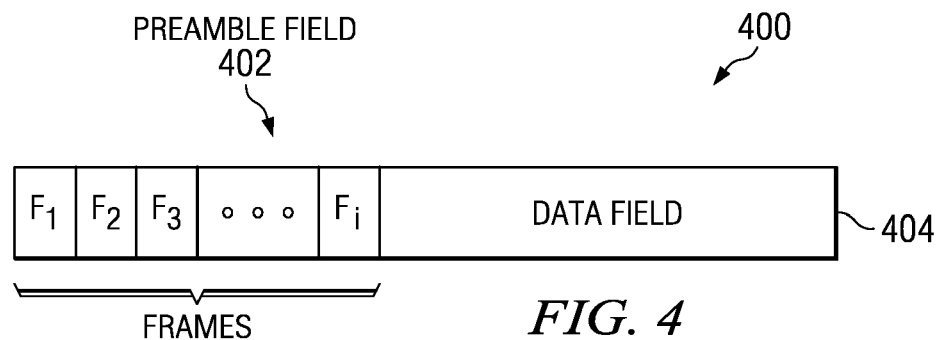
FIG. 4 is a diagram of an illustrative data packet including a preamble field and a data field.

In the presently disclosed embodiment, each message signal transmitted by the OFDM transmitter 102 and received by the OFDM receiver 104 over the power line 112 comprises at least one packet 400, which includes a preamble field 402 and a data field 404 (see FIG. 4). The preamble field 402 is configured to carry a predetermined data pattern, and the data field is configured to carry the information being transmitted. In the OFDM communications system 100, signals comprising the transmitted messages are spread across multiple sub-carrier frequencies. In one embodiment, the transmitted messages are spread across 60 sub-carrier frequencies ranging from 29 kHz to 88 kHz. Further, both the transmitted signals and the received signals are generated and detected, respectively, by suitable sampled data digital signal processing techniques. Accordingly, in the preferred embodiment, the inverse fast Fourier transform (IFFT) and the fast Fourier transform (FFT) algorithms are employed in the generation and the detection of the transmitted and received message signals, respectively.

In the OFDM communications system 100 of FIG. 1, the preamble field 402 of each packet 400 includes multiple frames $F_1$-$F_i$ (see FIG. 4). Further, each frame $F_1$-$F_i$ includes N waveform samples, in which N equals $2^n$. In other words, the length of each frame is a binary power of two. For example, the frame length may be equal to 256 samples. The IFFT algorithm may therefore be employed to generate a waveform for transmission that includes up to N/2 sine (cosine) wave signals, which are orthogonal over the interval of the N sample frame. As a result, the FFT algorithm provides an output for each sub-carrier frequency that has a null at each of the other (N/2)−1 sub-carrier frequencies.

Because sub-carrier frequencies above $$\frac{F_s/2}{\sqrt{2}}, \tag{1}$$

in which "$F_s$" is the sampling frequency, may be difficult to detect when packets arrive at the OFDM receiver 104 asynchronously, and because the transmitting bandwidth typically has a predefined lower limit, a subset of the possible N/2 sub-carrier frequencies is employed by the OFDM communications system 100. For example, the subset of sub-carrier frequencies may be expressed as $$\text{Sub-carrierBand}=[m_0, \ldots, m_{M-1}], \tag{2}$$

in which each one of the elements "$m_0$-$m_{M-1}$" is a complex quantity used by the IFFT algorithm to determine the magnitude and phase of a respective sub-carrier waveform. Further, the sampling frequency $F_s$ may be equal to 250 kHz or any other suitable frequency.

Because the respective sub-carrier frequencies "$m_0$-$m_{M-1}$" are expressed as complex quantities, the OFDM communications system 100 employs the quadrature phase shift keyed (QPSK) modulation technique. It is understood that the QPSK modulation technique is employed herein for purposes of illustration, and that binary phase shift keyed (BPSK) modulation or any other suitable modulation technique may alternatively be employed. In the QPSK modulation technique, four equally spaced phases may be chosen and mapped to two data bits at a time. For example, the data values 0x00, 0x01, 0x10, and 0x11 may be mapped to the phases 0°, 90°, 180°, and 270°, respectively (see also FIG. 5). The Cartesian coordinates corresponding to these phases may then be employed to construct a sub-carrier vector including the complex quantities $m_0$-$m_3$, which are subsequently provided as input to the IFFT algorithm to generate the transmitted waveform within the OFDM transmitter 102. To detect a transmitted waveform signal at the OFDM receiver 104, the waveform is sampled at the sampling frequency $F_s$ and frames of N samples are provided as input to the FFT algorithm.

FIG. 2 depicts a detailed view of the OFDM transmitter 102 included in the OFDM communications system 100 (see FIG. 1). As shown in FIG. 2, the OFDM transmitter 102 includes a preamble data pattern pre-coder 202, a serial-to-parallel converter (SPC) 204, a data-to-phase mapper 206, an IFFT processor 208, and a digital-to-analog converter (DAC) 210. Specifically, the preamble pre-coder 202 is operative to receive a digital data signal XMIT_D (packet) to be transmitted, to encode a predetermined data pattern in the preamble field of the packet XMIT_D, and to provide the encoded signal XMIT_D to the SPC 204. The SPC 204 is operative to convert the encoded signal to a plurality of sub-signals XMIT_D.1-K, each corresponding to a respective sub-carrier frequency, and to provide the sub-signals XMIT_D.1-K to the data-to-phase mapper 206. The data-to-phase mapper 206 is operative to map the data contained in each of the sub-signals XMIT_D.1-K to corresponding phases, and to provide mapped sub-signals XMIT_P.1-K to the IFFT processor 208. The IFFT processor 208 is operative to convert the sub-signals XMIT_P.1-K from the frequency domain to the time domain, and to provide converted sub-signals XMIT_T.1-K to the DAC 210. The DAC 210 is operative to convert the digital sub-signals XMIT_T.1-K to analog form, and to provide the analog sub-signals to the power line transceiver and coupling circuitry 106 for subsequent transmission over the power line 112 (see FIG. 1). It is noted that each one of the sub-signals XMIT_T.1-K provided by the IFFT processor 208 comprises an IFFT frame including a plurality of complex quantities ("symbols"). Further, when the IFFT frame is transmitted over the power line 112, the real part of each sub-carrier symbol undergoes transmission, while the imaginary part of each symbol is ignored.

FIG. 3 depicts a detailed view of the OFDM receiver 104 included in the OFDM communications system 100 (see FIG. 1). As shown in FIG. 3, the OFDM receiver 104 includes an analog-to-digital converter (ADC) 302, an FFT processor 304, and a preamble detector 306. Specifically, the ADC 302 is operative to receive transmitted analog sub-signals RECV_T over the power line 112 via the power line transceiver and coupling circuitry 106, to convert the received sub-signals RECV_T to digital form, and to provide digital sub-signals RECV_T.1-K to the FFT processor 304. It is understood that each of the received sub-signals RECV_T.1-K comprises a packet including the predetermined preamble data pattern. The FFT processor 304 is operative to convert the sub-signals RECV_T.1-K from the time domain to the frequency domain, and to provide converted sub-signals RECV_P.1-K to the preamble detector 306. Like the IFFT processor 208, the FFT processor 304 provides multiple sub-signals RECV_P.1-K, in which each sub-signal comprises an FFT frame including a plurality of complex quantities (symbols).

The preamble detector 306 includes a phase detector 308, a phase-to-bit mapper 310, and a fault tolerance detector 312. The phase detector 308 is operative to detect the phase of the predetermined preamble data pattern within each of the sub-signals RECV_P.1-K, and to provide the detected phases to the phase-to-bit mapper 310. The phase-to-bit mapper 310 is operative to map the detected phases to corresponding data bits, and to provide mapped sub-signals RECV_B.1-K to the fault tolerance detector 312. The fault tolerance detector 312 is operative to compare the detected phases of the predetermined preamble data pattern within each received sub-signal to the expected phase of the preamble data pattern, and to determine the presence of one or more transmitted messages based on the results of the comparison. It is noted that the preamble detector 306 may subsequently provide the received sub-signals to a parallel-to-serial converter (PSC; not shown) for converting the multiple sub-signals to signals of a single channel.

The presently disclosed OFDM communications system 100 (see FIG. 1) will be better understood with reference to the following detailed description. As described above, the preamble field of each data packet includes multiple frames, and each frame includes N waveform samples such that the length of each frame is a binary power of two. In the preferred embodiment, each packet preamble includes a respective frame that is repeated 6.5 times. Further, the repeated frame comprises a predetermined data pattern that is mapped to complex modulation values for each sub-carrier frequency. Specifically, after the sub-signals RECV_T.1-K are received by the FFT processor 304, the FFT processor 304 generates one or more FFT frames, in which each FFT frame comprises a set of complex quantities $\theta_k$ corresponding to one of the sub-carrier frequencies 1-K. Because the preamble data pattern is repeating, the power for each sub-carrier is substantially the same, regardless of which sample in the preamble is chosen as the first sample in the FFT frame. However, the phase of each sub-carrier is dependent upon the orientation of the FFT frame relative to the transmitted IFFT frame. In other words, each complex quantity $\theta_k$ has a phase $D_k$ that is a function of the original transmitted phase, and a phase offset $\alpha(n,k)$ due to a misalignment between the transmitted IFFT frame and the corresponding FFT frame at the OFDM receiver 104.

In the presently disclosed embodiment, the sub-carrier phase value $\theta_k$ is expressed as $$\theta_k = D_k + \alpha(n,k), \tag{3}$$

in which "$D_k$" is the phase defined by the preamble data pattern for the respective sub-carrier frequency, and "$\alpha(n, k)$" is the phase offset relative to the start of the FFT frame. Specifically, "n" is a number of waveform samples representing the phase offset of the FFT frame relative to the transmitted IFFT frame, and "k" is a bin number corresponding to the sub-carrier frequency. Further, the phase offset $\alpha(n,k)$ is expressed as $$\alpha(n, k) = \frac{n \cdot k}{N \cdot F_s} 2\pi, \tag{4}$$

in which "N" is the length (i.e., the number of waveform samples) of the received frame, and "$F_s$" is the sampling frequency. The phase offset $\alpha(n,k)$ may be conceptually viewed as a ramp function with respect to the sub-carrier having bin number k, in which the slope of the ramp is determined by the phase offset n.

According to the present invention, the preamble detector 306 provides a preamble detection mechanism that is insensitive to phase, i.e., insensitive to the phase offset n. Specifically, if a received signal is defined in terms of the difference between adjacent sub-carrier phases $\theta_k$ and $\theta_{k-1}$, then the above-described phase offset ramp function can be eliminated from the result of the preamble detection processing. However, a phase offset remains for each received sub-carrier that is a function of the phase offset misalignment between the transmitted IFFT frame and the FFT frame at the OFDM receiver 104.

To make the detection of the preamble insensitive to the misalignment between the IFFT and FFT frames, the phase detector 308 calculates a first difference between adjacent sub-carrier phases, i.e., $$\Delta\theta_k = \theta_k - \theta_{k-1}, \tag{5}$$

in which $$\theta_k = \left( \frac{n \cdot k}{N \cdot F_s} 2\pi + D_k \right) \tag{6}$$

and $$\theta_{k-1} = \left( \frac{n \cdot k - 1}{N \cdot F_s} 2\pi + D_{k-1} \right). \tag{7}$$

Accordingly, $$\Delta\theta_k = \frac{n}{N \cdot F_s} 2\pi + D_k - D_{k-1}, \tag{8}$$

in which the remaining phase offset for each sub-carrier is defined as $$\frac{n}{N \cdot F_s} 2\pi. \tag{9}$$

Next, the phase detector 308 calculates a second difference between the adjacent sub-carrier phases $\theta_k$ and $\theta_{k-1}$ to eliminate the remaining phase offset, thereby leaving sub-carrier phases that are independent of the phase offset n. This second difference between the adjacent sub-carrier phases is expressed as $$\Delta^2\theta_k = \Delta\theta_k - \Delta\theta_{k-1}, \tag{10}$$

in which $$\Delta\theta_k \left( \frac{n}{N \cdot F_s} 2\pi + D_k - D_{k-1} \right) \tag{11}$$

and $$\Delta\theta_{k-1} = \left( \frac{n}{N \cdot F_s} 2\pi + D_{k-1} - D_{k-2} \right). \tag{12}$$

Accordingly, $$\Delta^2\theta_k = D_k - 2D_{k-1} + D_{k-2}, \tag{13}$$

which is independent of the phase offset n.

In the presently disclosed embodiment, the preamble pre-coder 202 (see FIG. 2) is operative to encode the predetermined preamble data pattern of each transmitted signal so that the phase difference expressed in equation (13) is taken into account, thereby allowing the OFDM receiver 104 to receive and detect the presence of transmitted signals regardless of the phase offset of the respective IFFT and FFT frames. This is achieved by calculating the cumulative phase of the modulated preamble data pattern twice, and transmitting the resulting phase.

Specifically, the M 2-bit data symbols that make up the preamble data pattern for a respective sub-carrier frequency having a bin number k is defined as $$\vec{m} = [m_0, m_1, \ldots, m_k, \ldots, m_{M-1}], \tag{14}$$

Next, the double cumulative phase of the modulated preamble data pattern is calculated by first calculating an intermediate first cumulative phase $a_k$, and then calculating the second cumulative phase $D_k$. As described above, $D_k$ is the phase of each complex quantity $\theta_k$ included in the FFT frame. The intermediate first cumulative phase $a_k$ is calculated as follows.

$$a_0 = 0 + m_0 = m_0 \tag{15}$$

$$a_1 = a_0 + m_1 = m_0 + m_1$$

$$a_2 = a_1 + m_2 = m_0 + m_1 + m_2$$

$$a_k = \sum_{n=0}^{k} m_n$$

Further, the second cumulative phase $D_k$ is calculated as follows.

$$D_0 = 0 + a_0 = m_0 \tag{16}$$

$$D_1 = D_0 + a_1 = (m_0) + (m_0 + m_1) = 2m_0 + m_1$$

$$D_2 = D_1 + a_2 = (2m_0 + m_1) + (m_0 + m_1 + m_2)$$

$$= 3m_0 + 2m_1 + m_2$$

$$D_k = \sum_{n=0}^{k} (k + 1 - n) m_n$$

Next, the second cumulative phase $D_k$ (see equations (16)) is substituted into the expression for the second difference between the adjacent sub-carrier phases $\Delta^2\theta_k$ (see equation (13)) Specifically, $$\Delta^2\theta_k = D_k - 2D_{k-1} + D_{k-2}$$

$$= \sum_{n=0}^{u=k} (u+1-n)m_n - 2\sum_{n=0}^{u=k-1} (u+1-n)m_n +$$

$$\sum_{n=0}^{u=k-2} (u+1-n)m_n$$

$$= m_k + 2m_{k-1} + \sum_{n=0}^{u=k-2} (u+1-n)m_n - 2$$

$$\left[ m_{k-1} + \sum_{n=0}^{u=k-2} (u+1-n)m_n \right] + \sum_{n=0}^{u=k-2} (u+1-n)m_n$$

and therefore, $$\Delta^2\theta_k = m_k. \tag{17}$$

Accordingly, by substituting the second cumulative phase $D_k$ into the expression for the second difference between the adjacent sub-carrier phases $\Delta^2\theta_k$, the original preamble data pattern $m_k$ is obtained. This means that by generating the transmitted signal using the twice accumulated sum of the preamble data symbol phases, and by generating the received symbols by taking the phase difference of the received sub-carrier values twice, the preamble data pattern can effectively be decoded at the OFDM receiver 104 (see FIG. 3) without requiring knowledge of the start of the transmitted IFFT frame. It is noted, however, that each value generated by the FFT processor 304 is a Cartesian complex pair, not a phase value. For this reason, the double difference phase detection processing technique performed by the preamble detector 306 is expressed in terms of complex quantities.

Specifically, each Cartesian complex pair generated by the FFT processor 304 is expressed as $x_k, y_k$, in which "$x_k$" is the real part and "$y_k$" is the imaginary part of the detected sub-carrier signal power. The double difference phase detection processing therefore includes taking a first phase difference, which is expressed as $$d\vec{\theta} = carrier_1 - carrier_0, carrier_2 - carrier_1, \ldots \tag{18}$$

$$d\theta_k = carrier_k - carrier_{k-1}$$

$$= \operatorname{atan}\left(\frac{y_k}{x_k}\right) - \operatorname{atan}\left(\frac{y_{k-1}}{x_{k-1}}\right) = \operatorname{atan}\left(\frac{y_k x_{k-1} - x_k y_{k-1}}{x_k x_{k-1} + y_k y_{k-1}}\right),$$

and taking a second phase difference, which is expressed as $$dd\overline{\theta} = d\theta_1 - d\theta_0, d\theta_2 - d\theta_1, \ldots \quad (19)$$

$$dd\theta_k = d\theta_k - d\theta_{k-1}$$

$$= \mathrm{atan}\left(\frac{y_k x_{k-1} - x_k y_{k-1}}{x_k x_{k-1} + y_k y_{k-1}}\right) - \mathrm{atan}\left(\frac{y_{k-1} x_{k-2} - x_{k-1} y_{k-2}}{x_{k-1} x_{k-2} + y_{k-1} y_{k-2}}\right)$$

$$= \mathrm{atan}\begin{pmatrix} (x_{k-1} x_{k-2} + y_{k-1} y_{k-2})(y_k x_{k-1} - x_k y_{k-1}) - \\ (x_k x_{k-1} + y_k y_{k-1})(y_{k-1} x_{k-2} - x_{k-1} y_{k-2}) \\ \hline (x_k x_{k-1} + y_k y_{k-1})(x_{k-1} x_{k-2} + y_{k-1} y_{k-2}) + \\ (y_k x_{k-1} - x_k y_{k-1})(y_{k-1} x_{k-2} - x_{k-1} y_{k-2}) \end{pmatrix}.$$

Let $dd\theta_k = \mathrm{atan}(q/p)$, in which $$q = (x_{k-1} x_{k-2} + y_{k-1} y_{k-2})(y_k x_{k-1} - x_k y_{k-1}) - (x_k x_{k-1} + y_k y_{k-1})$$
$$(y_{k-1} x_{k-2} - x_{k-1} y_{k-2})$$

$$p = (x_k x_{k-1} + y_k y_{k-1})(x_{k-1} x_{k-2} + y_{k-1} y_{k-2}) + (y_k x_{k-1} - x_k y_{k-1})$$
$$(y_{k-1} x_{k-2} - x_{k-1} y_{k-2}). \quad (20)$$

Further, let $$c_{curr0} = x_k x_{k-1} + y_k y_{k-1}$$

$$c_{curr1} = y_k x_{k-1} - x_k y_{k-1}$$

$$c_{prev0} = x_{k-1} x_{k-2} + y_{k-1} y_{k-2}$$

$$c_{prev1} = y_{k-1} x_{k-2} - x_{k-1} y_{k-2}, \quad (21)$$

in which "$c_{prev0}$" and "$c_{prev1}$" are versions of "$c_{curr0}$" and "$c_{curr1}$" from the previous sample time, respectively. The variables p and q may therefore be expressed as $$q = c_{prev0} \cdot c_{curr1} - c_{prev1} \cdot c_{curr0}$$

$$p = c_{prev0} \cdot c_{curr0} + c_{prev1} \cdot c_{curr1}. \quad (22)$$

Accordingly, by comparing "q" to "p", the quadrant of the Cartesian plane in which the corresponding phase resides may be determined without having to perform the arctangent function "atan(q/p)" (see equations (19)).

For example, the phase-to-bit mapper 310 (see FIG. 3) may be operative to perform phase-to-bit mapping as defined in TABLE I below, i.e.,

TABLE I

| phase | bit1 | bit0 | p | q | −q > p | \|q\| > \|p\| |
|---|---|---|---|---|---|---|
| 0° | 0 | 0 | 1 | 0 | 0 | 0 |
| 90° | 0 | 1 | 0 | 1 | 0 | 1 |
| 180° | 1 | 0 | −1 | 0 | 1 | 0 |
| 270° | 1 | 1 | 0 | −1 | 1 | 1 | and the fault tolerance detector 312 (see FIG. 3) may be operative to perform the comparison of q and p as follows, $$bit_{1k} = -q_k > p_k,$$

$$bit_{0k} = |q_k| > |p_k|, \text{ and}$$

$$dd\theta_k = 2 bit_{1k} + bit_{0k}.$$

Figure 5:
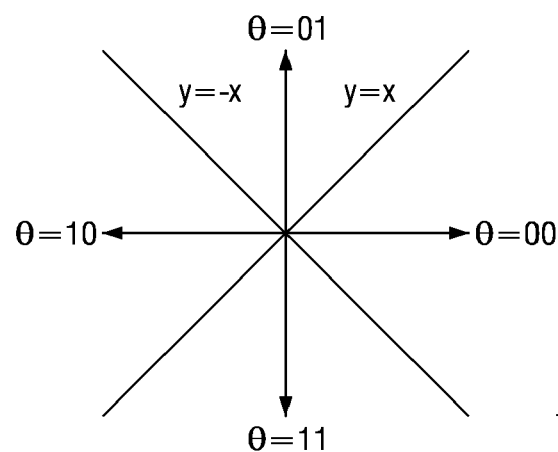
FIG. 5 is a graph of illustrative mapping positions corresponding to a pre-coded data pattern contained in the preamble field of FIG. 4.

Accordingly, the phase matching positions of the pre-coded preamble data pattern may be determined on the basis of the logical signal levels of the received data stream and the phase mapping positions of the pre-coded data, as illustrated in FIG. 5.

As described above, after the phase of each sub-carrier in the received preamble frame has been detected, the fault tolerance detector 312 compares the detected phase to the expected phase of the predetermined preamble data pattern. In the presently disclosed embodiment, the distance of each detected sub-carrier phase ($dd\theta_{k(detected)}$) from the expected phase ($dd\theta_{k(expected)}$) is defined as $$distance_k = |dd\theta_{k(detected)} - dd\theta_{k(expected)}|. \quad (24)$$

Further, a metric for the phase error between the expected transmitted signal and the detected received signal is defined as the sum of these distances for each sub-carrier symbol, i.e., $$ddPhaseError = \sum_{k=0}^{M} distance_k. \quad (25)$$

For example, in the QPSK modulation technique, there are four possible transmit phases and four possible receive phases. Accordingly, there are 16 possible combinations that generate a distance, as indicated in TABLE II below.

TABLE II

| rx phase | tx phase | distance |
|---|---|---|
| 0 | 0 | 0 |
| 0 | 1 | 1 |
| 0 | 2 | 2 |
| 0 | 3 | 1 |
| 1 | 0 | 1 |
| 1 | 1 | 0 |
| 1 | 2 | 1 |
| 1 | 3 | 2 |
| 2 | 0 | 2 |
| 2 | 1 | 1 |
| 2 | 2 | 0 |
| 2 | 3 | 1 |
| 3 | 0 | 1 |
| 3 | 1 | 2 |
| 3 | 2 | 1 |
| 3 | 3 | 0 |

It is noted that the relationship of ddPhaseError (see equation (25)) to the expected transmitted phase and the detected received phase may alternatively be expressed in terms of Boolean logic, logical statements in digital signal processing code, or a lookup table. For example, in the lookup table implementation, the correct phase distance may be determined by multiplying the detected received phase by four, adding it to the expected transmit phase, and using the resulting quantity as an index to the lookup table.

In the presently disclosed embodiment, to determine whether an FFT frame generated by the FFT processor 304 (see FIG. 3) indicates the presence of a transmitted message (packet), the fault tolerance detector 312 compares the double difference phase error, i.e., ddPhaseError, for that frame to a predetermined threshold. It is noted, however, that for the noisy communication channels within the power line modem 110 (see FIG. 1), it may not be possible to make a decision regarding the presence of the packet in a single measurement. For this reason, predetermined upper and lower thresholds and a state counter (not shown) may be employed by the fault tolerance detector 312. For example, in the event the ddPhaseError is less than the lower predetermined threshold, the state counter is incremented. In the event the ddPhaseError is between the lower predetermined threshold and the upper predetermined threshold, the state counter is maintained at its current value. In the event the ddPhaseError is greater than the upper predetermined threshold, the state counter is reset. In this way, the confidence level relating to the detection of the presence of the transmitted packet can be increased.

Figure 7A:
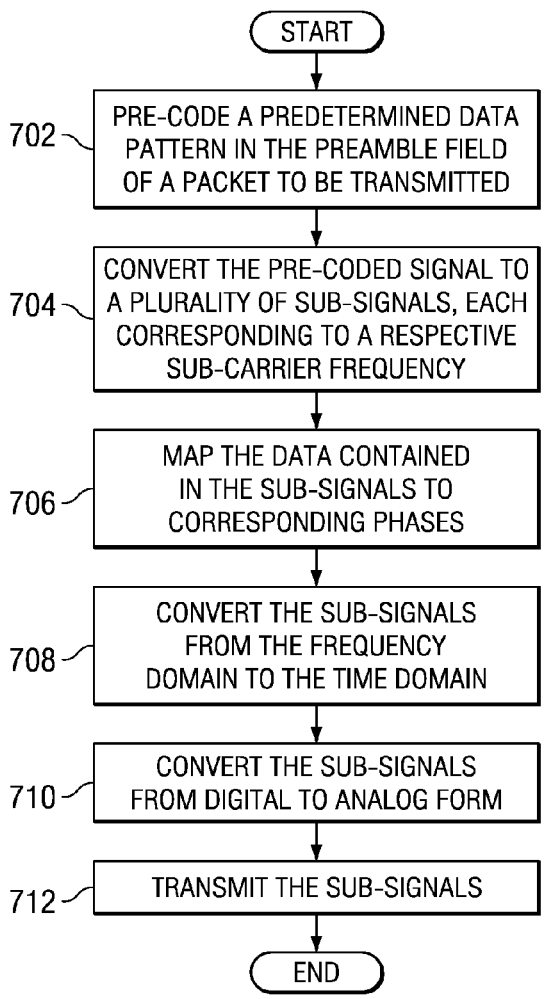
FIGS. 7a-7b is a flow diagram of a method of operating the OFDM communications system of FIG. 1.

A method of operating the OFDM transmitter included in the presently disclosed OFDM communication system is illustrated by reference to FIG. 7a. As depicted in step 702, a predetermined data pattern in the preamble field of a packet to be transmitted is pre-coded. In the presently disclosed embodiment, the preamble data pattern is pre-coded such that $$D_k = \sum_{n=0}^{k}(k+1-n)m_n, \text{ and } \vec{m} = [m_0, m_1, \ldots, m_k, \ldots, m_{M-1}],$$

in which "$\vec{m}$" represents the M 2-bit data symbols that make up the preamble data pattern. Next, the pre-coded signal is converted, as depicted in step 704, to a plurality of sub-signals XMIT_D.1-K, each corresponding to a respective sub-carrier frequency. The data contained in the sub-signals is then mapped, as depicted in step 706, to corresponding phases. Next, the mapped sub-signals XMIT_P.1-K are converted, as depicted in step 708, from the frequency domain to the time domain. The sub-signals are then converted, as depicted in step 710, from digital to analog form. Finally, the sub-signals are transmitted, as depicted in step 712.

Figure 7B:
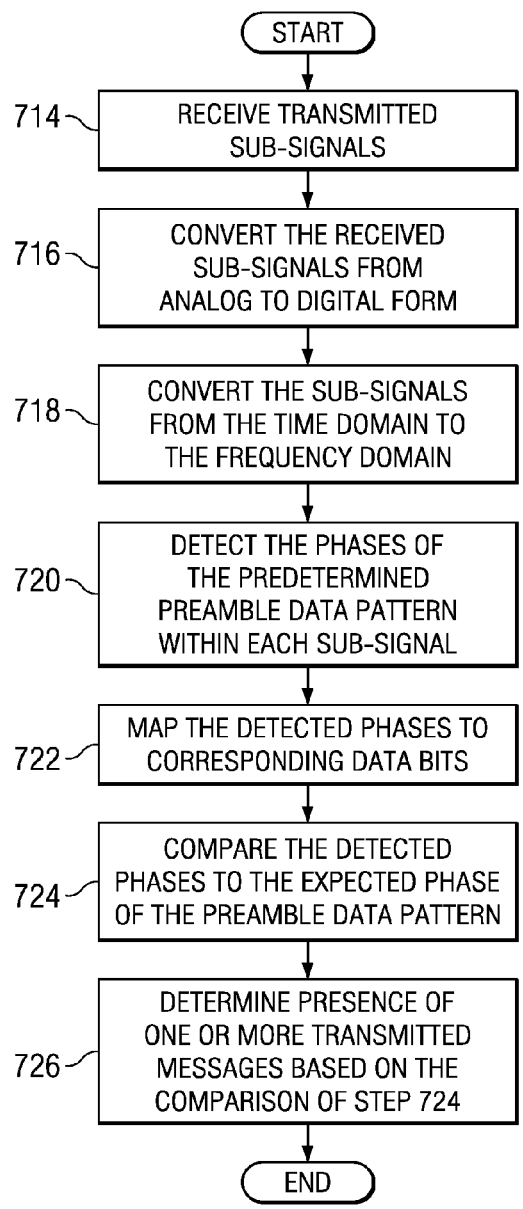

A method of operating the OFDM receiver included in the presently disclosed OFDM communication system is illustrated by reference to FIG. 7b. As depicted in step 714, one or more transmitted sub-signals are received. Next, the received sub-signals are converted, as depicted in step 716, from analog to digital form. The sub-signals are then converted, as depicted in step 718, from the time domain to the frequency domain. Next, the phase of the predetermined preamble data pattern within each sub-signal are detected, as depicted in step 720. The detected phases are then mapped, as depicted in step 722, to corresponding data bits. Next, the detected phases are compared, as depicted in step 724, to the expected phase of the preamble data pattern. Finally, the presence of one or more transmitted messages is determined, as depicted in step 726, based on the comparison of step 724. In the presently disclosed embodiment, the double difference phase error, i.e., ddPhaseError (see also equation (25)), for the respective messages is calculated and compared to a predetermined threshold to detect the presence of the transmitted messages.

Having described the above illustrative embodiments, other alternative embodiments or variations may be made. Specifically, the double difference phase detection processing technique performed by the preamble detector 306 (see FIG. 3) may employ alternative phase mappings. For example, an alternative phase mapping may place the four transmitted phases on 45° lines, and assign the phase in a gray-coded sequence. In this case, the data values 0x00, 0x01, 0x11, and 0x10 may be mapped to the phases 0°, 90°, 180°, and −90°, respectively (see FIG. 6). Further, the phase-to-bit mapper 310 (see FIG. 3) may be operative to perform phase-to-bit mapping as defined in TABLE III below.

TABLE III

| phase | bit1 | bit0 | p | q | −q > p | q > p |
|---|---|---|---|---|---|---|
| 0° | 0 | 0 | 1 | 0 | 0 | 0 |
| 90° | 0 | 1 | 0 | 1 | 0 | 1 |
| 180° | 1 | 1 | −1 | 0 | 1 | 1 |
| 270° | 1 | 0 | 0 | −1 | 1 | 0 |

Figure 6:
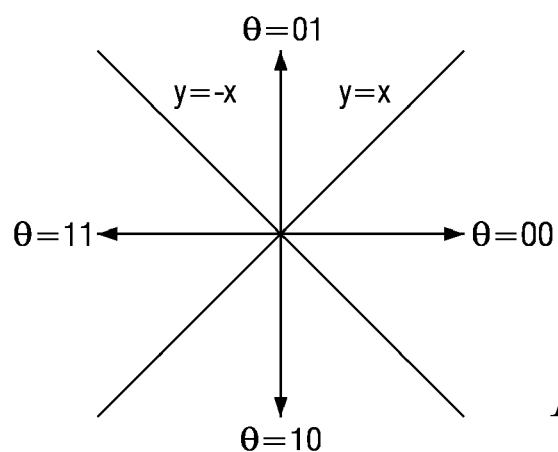
FIG. 6 is a graph of alternative mapping positions corresponding to a pre-coded data pattern contained in the preamble field of FIG. 4.

Accordingly, the phase matching positions of the pre-coded preamble data pattern may be determined on the basis of the logical signal levels of the received data stream and the phase mapping positions of the pre-coded data, as illustrated in FIG. 6. It is noted that the alternative phase-to-bit mapping of TABLE III simplifies the conversion of q and p into data bits because the absolute value function is not required for bit 0 (see equations (23)).

In addition, although it was described that the detected phases of the pre-coded preamble data pattern are mapped to corresponding data bits before comparing the detected phases to the expected phases of the preamble data pattern, the step of comparing to the known preamble data pattern may alternatively be performed in values of phase instead of bits. This alternative approach is particularly useful when there is relatively good alignment between the clock frequency of the OFDM transmitter and that of the OFDM receiver.

Figure 8:
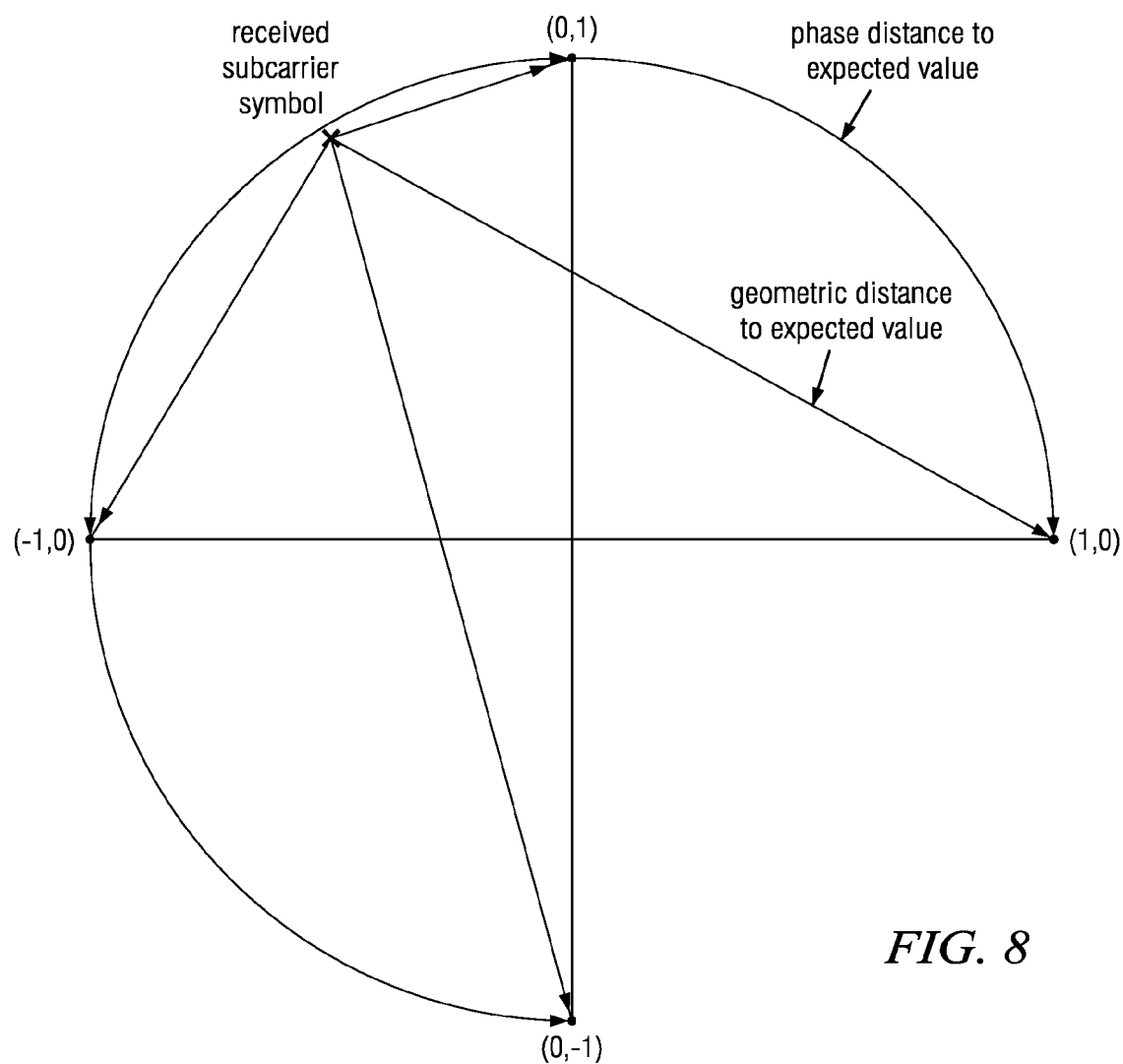
FIG. 8 is a diagram illustrating the geometric distances and the corresponding phase distances between a received sub-carrier symbol and a plurality of expected sub-carrier values. Such geometric distances, as illustrated in FIG. 8, are employed in an alternative method of operating the OFDM receiver of FIG. 1.

Specifically, to determine whether a received FFT frame comprises a frame of the packet preamble, the detected phase for each sub-carrier is compared to the expected phase for that sub-carrier to obtain a difference between the detected and expected phases, and the magnitudes of the respective phase differences are summed. In this alternative embodiment, the sum of the respective phase differences is expressed as $$\text{distance} = \sum_{k=1}^{N}|dd\theta_k - \theta_{k\,expected}| < \text{threshold}, \tag{26}$$

in which "distance" represents an "error distance", "$dd\theta_k$" is the detected sub-carrier phase, "$\theta_{k\,expected}$" is the expected sub-carrier phase, and "threshold" is a predetermined threshold value. Further, the error distance is defined as the geometric distance between each received complex sub-carrier value and the corresponding expected complex sub-carrier value. The sum of these geometric distances is then compared to the predetermined threshold value, as indicated in equation (26). FIG. 8 depicts a diagram illustrating the geometric distances and the corresponding phase distances between a received sub-carrier symbol and a plurality of expected sub-carrier values (0,1), (−1,0), (0,−1), and (1,0).

The square of the error distance is employed to calculate the geometric distance from each complex sub-carrier symbol value to the expected value for that sub-carrier. The square of the error distance is expressed as $$\begin{aligned}\text{distance}_k^2 &= (pr_k - pe_k)^2 + (qr_k - qe_k) \\ &= pr_k^2 - 2pr_k pe_k + pe_k^2 + qr_k^2 - 2qr_k qe_k + qe_k^2 \\ &= -2(pr_k pe_k + qr_k qe_k) + pr_k^2 + qr_k^2 + pe_k^2 + qe_k^2,\end{aligned} \tag{27}$$

in which "$pr_k$" is the real part of the received sub-carrier phase $dd\theta_k$, "$qr_k$" is the imaginary part of $dd\theta_k$, "$pe_k$" is the real part of the expected sub-carrier phase $\theta_{kexpected}$, and "qek" is the imaginary part of $\theta_{kexpected}$, for the $k^{th}$ sub-carrier.

For QPSK encoding, there are four possible expected phases encoded in the transmitted packet preamble, as indicated in TABLE IV below.

TABLE IV

| Phase (normalized to 90°) | $pe_k$ | $qe_k$ |
|---|---|---|
| 0 | 1 | 0 |
| 1 | 0 | 1 |
| 2 | −1 | 0 |
| 3 | 0 | −1 |

It is understood that the QPSK encoding technique is employed herein for purposes of illustration, and that any other suitable encoding technique may be employed.

After substituting the values of $pe_k$ and $qe_k$ from TABLE IV into equation (27), the error distances from an arbitrary received sub-carrier symbol to the expected sub-carrier values may be expressed as $$distance(0)_k^2 = -2pr_k + (pr_k^2 + qr_k^2 + 1)$$

$$distance(1)_k^2 = -2qr_k + (pr_k^2 + qr_k^2 + 1)$$

$$distance(2)_k^2 = +2pr_k + (pr_k^2 + qr_k^2 + 1)$$

$$distance(3)_k^2 = +2qr_k + (pr_k^2 + qr_k^2 + 1) \quad (28)$$

Further, it is concluded that the packet preamble has been received at the OFDM receiver when the distance metric defined by the sum of the error distances, e.g., the error distances of equations (28), is a minimum. For example, in the event the expected preamble phase for sub-carrier k is 1.0 (i.e., 90°) and the value distance(1)² is smaller than each of the values distance(0)², distance(2)², and distance(3)², it is concluded that a sub-carrier symbol having a phase of 90° has been received.

It is noted that the error distances from an arbitrary received sub-carrier symbol to the expected sub-carrier values may alternatively be expressed as $$dist(0)_k = pr_k = c_{prev0} \cdot c_{curr0} + c_{prev1} \cdot c_{curr1}$$

$$dist(1)_k = qr_k = c_{prev0} \cdot c_{curr1} - c_{prev1} \cdot c_{curr0}$$

$$dist(2)_k = -pr_k = -c_{prev0} \cdot c_{curr0} - c_{prev1} \cdot c_{curr1}$$

$$dist(3)_k = -qr_k = -c_{prev0} \cdot c_{curr1} + c_{prev1} \cdot c_{curr0}, \quad (29)$$

in which "$c_{prev0}$" and "$c_{prev1}$" are versions of "$c_{curr0}$" and "$c_{curr1}$" from the previous sample time, respectively (see also equations (21)). Unlike equations (28), equations (29) have no squared quantities. Further, it is concluded that the packet preamble has been received at the OFDM receiver when the distance metric defined by the sum of the error distances of equations (29) is a maximum.

Next, a table is constructed comprising the original message data before pre-coding expressed as phase values. This table is constructed based on the expected preamble data pattern, and is used to determine which distance equation "$dist(n)_k$" to use to find the distance metric sum expressed in equation (26). As described above, when the sum of the "$dist(n)_k$" values is a maximum, it is concluded that the packet preamble has been received at the OFDM receiver.

For example, in the event the OFDM communications system employs the QPSK modulation technique, TABLE V below may be constructed and subsequently employed to determine the "$dist(n)_k$" values.

TABLE V

| QPSK encoding | |
|---|---|
| Normalized phase value n | dist $(n)_k$ |
| 0 | 0 |
| 1 | 1 |
| 2 | 2 |
| 3 | 3 |

Alternatively, in the event the BPSK modulation technique is employed, TABLE VI below may be constructed and used to determine which distance equation "$dist(n)_k$" to use to find the distance metric sum expressed in equation (26).

TABLE VI

| BPSK encoding | |
|---|---|
| Normalized phase value n | dist $(n)_k$ |
| 0 | 0 |
| 1 | 2 |

An alternative method of operating the OFDM receiver included in the presently disclosed OFDM communication system is illustrated by reference to FIG. 9. In this illustrative OFDM receiver operating technique, it is assumed that QPSK modulation is employed. As depicted in step 902, one or more transmitted sub-signals are received. Next, the received sub-signals are converted, as depicted in step 904, from analog to digital form. The sub-signals are then converted, as depicted in step 906, from the time domain to the frequency domain. For example, the received sub-signals may comprise N data samples, and an N-point FFT may be performed on the N samples to generate an FFT frame comprising a complex output vector. Next, the elements of the complex output vector that correspond to the transmitted frequencies are saved and designated as Cartesian complex pairs ($x_k$, $y_k$), as depicted in step 908, in which k ranges from 0 to N (N=total number of sub-carriers). The saved elements of the complex output vector are then used to perform double difference phase detection. Specifically, for k ranging from 2 to N, a plurality of first variables is defined as $$c_{curr0} = x_k x_{k-1} + y_k y_{k-1}$$

$$c_{curr1} = y_k x_{k-1} - x_k y_{k-1}$$

$$c_{prev0} = x_{k-1} x_{k-2} + y_{k-1} y_{k-2}$$

$$c_{prev1} = y_{k-1} x_{k-2} - x_{k-1} y_{k-2}, \quad (30)$$

in which "$c_{prev0}$" and "$c_{prev1}$" are versions of "$c_{curr0}$" and "$c_{curr1}$" from the previous sample time, respectively, as depicted in step 910 (see also equations (21)). Next, a plurality of second variables is defined as $$qr_k = c_{prev0} \cdot c_{curr1} - c_{prev1} \cdot c_{curr0}$$

$$pr_k = c_{prev0} \cdot c_{curr0} + c_{prev1} \cdot c_{curr1}, \quad (31)$$

in which "$pr_k$" and "$qr_k$" correspond to the real and imaginary parts of the received sub-carrier phase $dd\theta_k$, respectively, as depicted in step 912 (see also equations (22)). A plurality of error distances is then defined as $$dist(0)_k = pr_k$$

$$dist(1)_k = qr_k$$

$$dist(2)_k = -pr_k$$

$$dist(3)_k = -qr_k, \quad (32)$$

as depicted in step 914 (see also equations (29))). Next, a determination is made, as depicted in step 916, as to whether the sum of the error distances indicated in equations (32) exceeds a predetermined threshold value. In the event the sum of the error distances exceeds the predetermined threshold value, it is concluded that a packet preamble has been received, as depicted in step 918. Otherwise, it is concluded that the packet preamble has not been received, as depicted in step 920.

Figure 9:
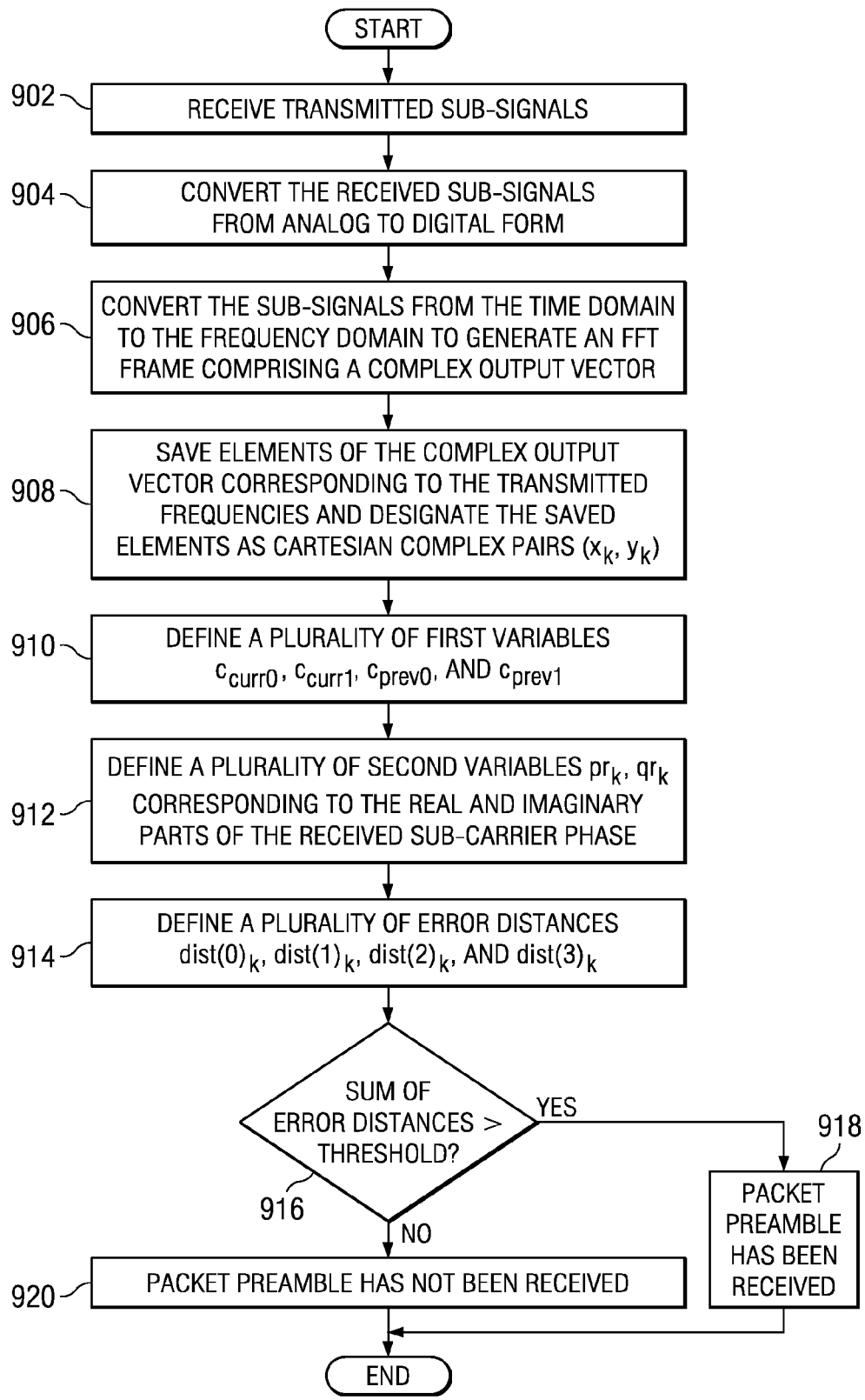
FIG. 9 is a flow diagram of the alternative method of operating the OFDM receiver of FIG. 1.

To normalize the method of FIG. 9 to fluctuations in signal strength, the sum of the error distances may alternatively be compared to the predetermined threshold value multiplied by the square of the signal power. Specifically, for each sub-carrier, the signal power may be calculated and summed over all of the sub-carriers, i.e., $$\text{power} = \frac{1}{N} \sum_{k=1}^{N} x_k^2 + y_k^2. \quad (33)$$

Further, to determine whether the packet preamble has been received, the following comparison may be performed:

$$\sum_{k=1}^{N} dist(n)_k > \text{threshold} \cdot \text{power}, \quad (34)$$

in which n=0,1,2,3. Accordingly, in the event the sum of the error distances ("dist(n)$_k$") exceeds the predetermined threshold value ("threshold") times the signal power ("power"), the packet preamble has been received at the OFDM receiver.

Figure 10A:
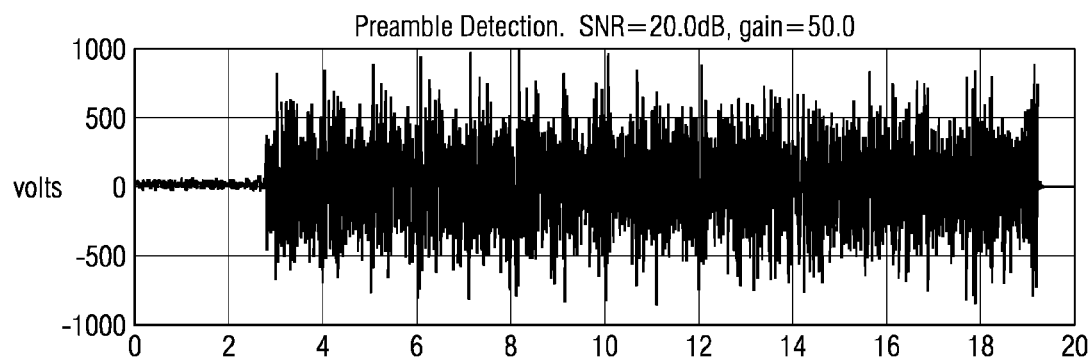
FIGS. 10a-10b and 11a-11b depict packets detected using the presently disclosed methods of operating the OFDM communications system of FIG. 1.
Figure 10B:
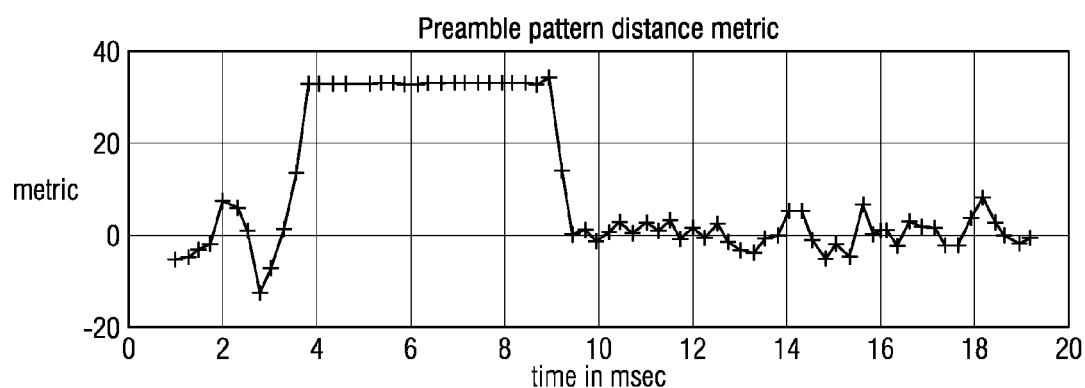
Figure 11A:
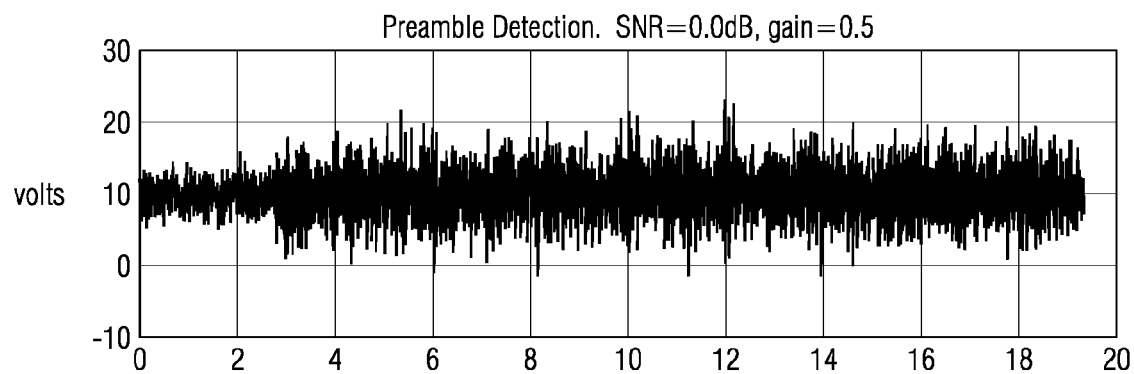
Figure 11B:
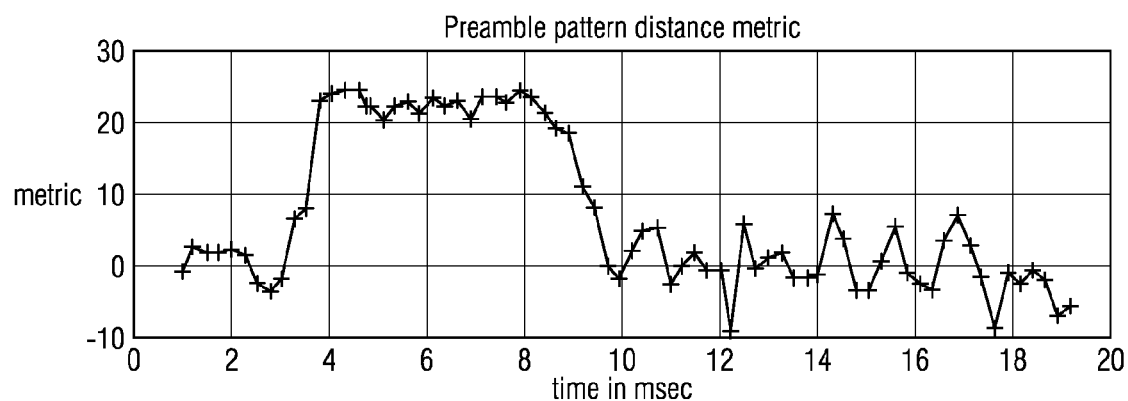

FIG. 10a depicts an illustrative example of a packet with six repeated preamble frames and ten data frames consisting of random data. In this example, the signal-to-noise ratio (SNR) is about 20 dB, the gain is about 50, and the OFDM transmitter to receiver clock mismatch is about 500 ppm. Further, overlapping 256 sample FFT frames are captured from the noisy received signal waveform, and the distance metric is calculated. FIG. 10b depicts a plot of the preamble pattern distance metric, in which the plot is proportional to the ratio of the distance metric over the signal power. FIG. 11a depicts the packet of FIG. 10a when the SNR is close to zero and the gain is about 0.5, and FIG. 11b depicts a plot of the preamble pattern distance metric for the packet of FIG. 11a.

Those of ordinary skill in the art will appreciate that the functionality of the OFDM communications system 100 (see FIG. 1) may be software-driven and executable out of a memory by a processor, or alternatively embodied in whole or in part using hardware components such as custom or semi-custom integrated circuits including Application Specific Integrated Circuits (ASICs), state machines, controllers, or any other suitable hardware components or devices, or a combination of hardware components and software.

It will further be appreciated by those of ordinary skill in the art that modifications to and variations of the above-described double difference phase detection technique may be made without departing from the inventive concepts disclosed herein. Accordingly, the invention should not be viewed as limited except as by the scope and spirit of the appended claims.

What is claimed is:

1. An orthogonal frequency division multiplexing (OFDM) communications system, comprising:
    an OFDM transmitter operative to transmit at least one data packet, the data packet comprising a predetermined data pattern within a preamble field, the OFDM transmitter being further operative to convert the data packet to a plurality of data packet sub-signals, each sub-signal corresponding to a respective sub-carrier frequency, to map the sub-signals to corresponding phases, to convert the sub-signals from the frequency domain to the time domain, and to convert the sub-signals from digital to analog form for subsequent transmission at the respective sub-carrier frequencies; and
    an OFDM receiver operative to receive the transmitted data packet sub-signals, to convert the received sub-signals from analog to digital form, to convert the received sub-signals from the time domain to the frequency domain, and to detect a phase of the pre-coded preamble data pattern within each received sub-signal,
    wherein the OFDM transmitter includes a preamble pre-coder operative to calculate first and second cumulative phases of sub-carriers corresponding to the predetermined preamble data pattern, and
    wherein the OFDM receiver includes a preamble detector operative to calculate first and second differences between adjacent ones of the second cumulative sub-carrier phases, thereby making the detection of the phase of the pre-coded preamble data pattern insensitive to phase offset misalignment between the transmitted and received data packet sub-signals.

2. The system of claim 1 wherein the predetermined preamble data pattern comprises M 2-bit data symbols represented by a vector "$\vec{m}$",
    wherein $$\vec{m} = [m_0, m_1, \ldots, m_k, \ldots, m_{M-1}], \text{ and}$$

wherein the preamble pre-coder is further operative to calculate the first cumulative sub-carrier phases substantially in accordance with the equations $$a_0 = 0 + m_0 = m_0$$

$$a_1 = a_0 + m_1 = m_0 + m_1$$

$$a_2 = a_1 + m_2 = m_0 + m_1 + m_2$$

$$a_k = \sum_{n=0}^{k} m_n.$$

3. The system of claim 1 wherein the predetermined preamble data pattern comprises M 2-bit data symbols represented by a vector "$\vec{m}$", wherein $\vec{m} = [m_0, m_1, \ldots, m_k, \ldots, m_{M-1}]$, and wherein the preamble pre-coder is further operative to calculate the second cumulative sub-carrier phases substantially in accordance with the equations $$D_0 = 0 + a_0 = m_0$$

$$D_1 = D_0 + a_1 = (m_0) + (m_0 + m_1) = 2m_0 + m_1$$

$$D_2 = D_1 + a_2 = (2m_0 + m_1) + (m_0 + m_1 + m_2)$$
$$= 3m_0 + 2m_1 + m_2$$

$$D_k = \sum_{n=0}^{k}(k+1-n)m_n.$$

4. The system of claim 3 wherein the preamble detector is further operative to calculate the first difference between the adjacent ones of the second cumulative sub-carrier phases substantially in accordance with the equation $$\Delta\theta_k = \theta_k - \theta_{k-1},$$

wherein $$\theta_k = \left(\frac{n \cdot k}{N \cdot F_s} 2\pi + D_k\right)$$

and $$\theta_{k-1} = \left(\frac{n \cdot k - 1}{N \cdot F_s} 2\pi + D_{k-1}\right), \text{ and}$$

wherein n represents the phase offset misalignment, N represents a length of a respective received sub-signal, and $F_s$ is a sampling frequency value.

5. The system of claim 3 wherein the preamble detector is further operative to calculate the second difference between the adjacent ones of the second cumulative sub-carrier phases substantially in accordance with the equation $$\Delta^2\theta_k = \Delta\theta_k - \Delta\theta_{k-1},$$

in which $$\Delta\theta_k = \left(\frac{n}{N \cdot F_s} 2\pi + D_k - D_{k-1}\right)$$

and $$\Delta\theta_{k-1} = \left(\frac{n}{N \cdot F_s} 2\pi + D_{k-1} - D_{k-2}\right), \text{ and}$$

wherein n represents the phase offset misalignment, N represents a length of a respective received sub-signal, and $F_s$ is a sampling frequency value.

6. The system of claim 1 wherein the OFDM receiver is further operative to generate a phase value corresponding to each received sub-signal, each phase value being representable by a Cartesian complex pair "$x_k, y_k$", "k" being a bin number corresponding to the respective received sub-signal, and wherein the preamble detector is further operative to compare a detected phase "$dd\theta_{k(detected)}$" of the pre-coded preamble data pattern to an expected phase "$dd\theta_{k(expected)}$" of the pre-coded preamble data pattern based on an evaluation of a phase error metric "ddPhaseError", wherein $$ddPhaseError = \sum_{k=0}^{M} distance_k,$$

wherein $distance_k = |dd\theta_{k(detected)} - dd\theta_{k(expected)}|,$ wherein $$dd\theta_k = a\tan\left(\frac{q}{p}\right),$$

and wherein $q = (x_{k-1}x_{k-2} + y_{k-1}y_{k-2})(y_k x_{k-1} - x_k y_{k-1}) - (x_k x_{k-1} + y_k y_{k-1})(y_{k-1}x_{k-2} - x_{k-1}y_{k-2})$ $p = (x_k x_{k-1} + y_k y_{k-1})(x_{k-1}x_{k-2} + y_{k-1}y_{k-2}) + (y_k x_{k-1} - x_k y_{k-1})(y_{k-1}x_{k-2} - x_{k-1}y_{k-2}).$ 7. The system of claim 6 wherein $c_{curr0} = x_k x_{k-1} + y_k y_{k-1}$ $c_{curr1} = y_k x_{k-1} - x_k y_{k-1}$ $c_{prev0} = x_{k-1}x_{k-2} + y_{k-1}y_{k-2}$ $c_{prev1} = y_{k-1}x_{k-2} - x_{k-1}y_{k-2},$ and $q = c_{prev0} \cdot c_{curr1} - c_{prev1} \cdot c_{curr0}$ $p = c_{prev0} \cdot c_{curr0} + c_{prev1} \cdot c_{curr1},$ and wherein the preamble detector is further operative to compare "q" to "p", thereby determining a quadrant of the Cartesian plane in which a corresponding phase of the pre-coded preamble data pattern resides.

8. The system of claim 7 wherein the preamble detector is further operative to perform a phase-to-bit mapping of the pre-coded preamble data pattern.

9. The system of claim 1 wherein the predetermined preamble data pattern comprises a respective frame that is repeated 6.5 times.

10. The system of claim 9 wherein the respective frame includes N samples of a waveform, N being equal to a power of 2.

11. The system of claim 10 wherein N is equal to 256.

12. The system of claim 10 wherein the OFDM transmitter is further operative to sample the waveform at a sampling frequency equal to 250 kHz.

13. The system of claim 1 wherein the plurality of data packet sub-signals correspond to respective sub-carrier frequencies, the respective sub-carrier frequencies comprising 60 sub-carrier frequencies ranging from about 29 kHz to about 88 kHz.

14. The system of claim 1 wherein the OFDM transmitter and the OFDM receiver are communicably coupleable to a power line.

15. The system of claim 1 wherein the OFDM receiver is further operative to generate a phase value corresponding to each received sub-signal, wherein the preamble detector is further operative to compare a detected phase "$dd\theta_k$" of the pre-coded preamble data pattern to an expected phase "$\theta_{kexpected}$" of the pre-coded preamble data pattern based on an evaluation of an error distance metric "distance", "k" being a bin number corresponding to the respective received sub-signal, and
wherein $$\text{distance} = \sum_{k=1}^{N} |dd\theta_k - \theta_{k\,expected}|.$$

16. The system of claim 15 wherein the preamble detector is further operative to compare the error distance metric "distance" to a predetermined threshold value.

17. The system of claim 15 wherein the preamble detector is further operative to calculate the square of the error distance metric "distance" substantially in accordance with the equation $$\text{distance}_k^2 = -2(pr_k pe_k + qr_k qe_k) + pr_k^2 + qr_k^2 + pe_k^2 + qe_k^2,$$

wherein "$pr_k$" is the real part and "$qr_k$" is the imaginary part of the detected phase "$dd\theta_k$", respectively, and
wherein "$pe_k$" is the real part and "$qe_k$" is the imaginary part of the expected phase "$\theta_{kexpected}$", respectively.

18. A method of operating an orthogonal frequency division multiplexing (OFDM) communications system, comprising the steps of:
providing at least one data packet, the data packet comprising a predetermined data pattern within a preamble field;
encoding the predetermined preamble data pattern within the data packet by an OFDM transmitter, including calculating first and second cumulative phases of sub-carriers corresponding to the predetermined preamble data pattern;
converting the data packet to a plurality of data packet sub-signals by the OFDM transmitter, each sub-signal corresponding to a respective sub-carrier frequency;
mapping the sub-signals to corresponding phases by the OFDM transmitter;
converting the sub-signals from the frequency domain to the time domain by the OFDM transmitter;
converting the sub-signals from digital to analog form;
transmitting the sub-signals at the respective sub-carrier frequencies by the OFDM transmitter;
receiving the transmitted data packet sub-signals by an OFDM receiver;
converting the received sub-signals from analog to digital form by the OFDM receiver;
converting the received sub-signals from the time domain to the frequency domain by the OFDM receiver;
detecting a phase of the encoded preamble data pattern within each received sub-signal by the OFDM receiver; and
calculating first and second differences between adjacent ones of the second cumulative sub-carrier phases, thereby making the detection of the phase of the pre-coded preamble data pattern insensitive to phase offset misalignment between the transmitted and received data packet sub-signals.

19. The method of claim 18 wherein the predetermined preamble data pattern comprises M 2-bit data symbols represented by a vector "$\vec{m}$",
wherein $\vec{m} = [m_0, m_1, \ldots, m_k, \ldots, m_{M-1}]$, and wherein the encoding step includes calculating the first cumulative sub-carrier phases substantially in accordance with the equations $$a_0 = 0 + m_0 = m_0$$
$$a_1 = a_0 + m_1 = m_0 + m_1$$
$$a_2 = a_1 + m_2 = m_0 + m_1 + m_2$$

$$a_k = \sum_{n=0}^{k} m_n.$$

20. The method of claim 18 wherein the predetermined preamble data pattern comprises M 2-bit data symbols represented by a vector "$\vec{m}$",
wherein $\vec{m} = [m_0, m_1, \ldots, m_k, \ldots, m_{M-1}]$, and wherein the encoding step includes calculating the second cumulative sub-carrier phases substantially in accordance with the equations $$D_0 = 0 + a_0 = m_0$$
$$D_1 = D_0 + a_1 = (m_0) + (m_0 + m_1) = 2m_0 + m_1$$
$$D_2 = D_1 + a_2 = (2m_0 + m_1) + (m_0 + m_1 + m_2)$$
$$= 3m_0 + 2m_1 + m_2$$

$$D_k = \sum_{n=0}^{k} (k + 1 - n) m_n.$$

21. The method of claim 18 wherein the calculating step includes calculating the first difference between the adjacent ones of the second cumulative sub-carrier phases substantially in accordance with the equation $$\Delta\theta_k = \theta_k - \theta_{k-1},$$

wherein $$\theta_k = \left(\frac{n \cdot k}{N \cdot F_s} 2\pi + D_k\right) \text{ and } \theta_{k-1} = \left(\frac{n \cdot k - 1}{N \cdot F_s} 2\pi + D_{k-1}\right), \text{ and}$$

wherein n represents the phase offset misalignment, N represents a length of a respective received sub-signal, and $F_s$ is a sampling frequency value.

22. The method of claim 18 wherein the calculating step includes calculating the second difference between the adjacent ones of the second cumulative sub-carrier phases substantially in accordance with the equation $$\Delta^2\theta_k = \Delta\theta_k - \Delta\theta_{k-1},$$

in which $$\Delta\theta_k = \left(\frac{n}{N \cdot F_s} 2\pi + D_k - D_{k-1}\right)$$
and
$$\Delta\theta_{k-1} = \left(\frac{n}{N \cdot F_s} 2\pi + D_{k-1} - D_{k-2}\right), \text{ and}$$

wherein n represents the phase offset misalignment, N represents a length of a respective received sub-signal, and $F_s$ is a sampling frequency value.

23. The method of claim 18 further including the step of generating a phase value corresponding to each received sub-signal by the OFDM receiver, each phase value being representable by a Cartesian complex pair "$x_k, y_k$", and further including the step of comparing the detected phase "$dd\theta_{k(detected)}$" of the pre-coded preamble data pattern to the expected phase "$dd\theta_{k(expected)}$" of the pre-coded preamble data pattern by the OFDM receiver, based on an evaluation of a phase error metric "ddPhaseError", wherein $$ddPhaseError = \sum_{k=0}^{M} distance_k,$$

wherein $$distance_k = |dd\theta_{k\ (detected)} - dd\theta_{k\ (expected)}|,$$

wherein $$dd\theta_k = \operatorname{atan}\left(\frac{q}{p}\right),$$

and wherein $q=(x_{k-1}x_{k-2}+y_{k-1}y_{k-2})(y_k x_{k-1}-x_k y_{k-1})-(x_k x_{k-1}+y_k y_{k-1})(y_{k-1}x_{k-2}-x_{k-1}y_{k-2})$ $p=(x_k x_{k-1}+y_k y_{k-1})(x_{k-1}x_{k-2}+y_{k-1}y_{k-2})+(y_k x_{k-1}-x_k y_{k-1})(y_{k-1}x_{k-2}-x_{k-1}y_{k-2}).$ 24. The method of claim 23 wherein $c_{curr0}=x_k x_{k-1}+y_k y_{k-1}$ $c_{curr1}=y_k x_{k-1}-x_k y_{k-1}$ $c_{prev0}=x_{k-1}x_{k-2}+y_{k-1}y_{k-2}$ $c_{prev1}=y_{k-1}x_{k-2}-x_{k-1}y_{k-2},$ and $q=c_{prev0}\cdot c_{curr1}-c_{prev1}\cdot c_{curr0}$ $p=c_{prev0}\cdot c_{curr0}+c_{prev1}\cdot c_{curr1},$ and further including the step of comparing "q" to "p", thereby determining a quadrant of the Cartesian plane in which a corresponding phase of the pre-coded preamble data pattern resides.

25. The method of claim 24 further including the step of performing a phase-to-bit mapping of the pre-coded preamble data pattern.

26. The method of claim 18 wherein the OFDM transmitter and the OFDM receiver are communicably coupleable to a power line.

27. The method of claim 18 further including the steps of generating a phase value corresponding to each received sub-signal, and comparing a detected phase "$dd\theta_k$" of the pre-coded preamble data pattern to an expected phase "$\theta_{kexpected}$" of the pre-coded preamble data pattern based on an evaluation of an error distance metric "distance", "k" being a bin number corresponding to the respective received sub-signal, and wherein $$distance = \sum_{k=1}^{N} |dd\theta_k - \theta_{k\ expected}|.$$

28. The method of claim 27 further including the step of comparing the error distance metric "distance" to a predetermined threshold value.

29. The method of claim 27 further including the step of calculating the square of the error distance metric "distance" substantially in accordance with the equation $$distance_k^2 = -2(pr_k pe_k + qr_k qe_k) + pr_k^2 + qr_k^2 + pe_k^2 + qe_k^2,$$

wherein "$pr_k$" is the real part and "$qr_k$" is the imaginary part of the detected phase "$dd\theta_k$", respectively, and wherein "$pe_k$" is the real part and "$qe_k$" is the imaginary part of the expected phase "$\theta_{kexpected}$", respectively.

* * * * *